United States Patent
Ghalandari

(10) Patent No.: US 12,330,352 B2
(45) Date of Patent: Jun. 17, 2025

(54) BLADES OF AN AXIAL TURBINE

(71) Applicant: Mohammad Ghalandari, Karaj (IR)

(72) Inventor: Mohammad Ghalandari, Karaj (IR)

(73) Assignee: MAPNA Turbine Engineering and Manufacturing Company (IR)

(*) Notice: Subject to any disclaimer, the term of this patent is extended or adjusted under 35 U.S.C. 154(b) by 0 days.

(21) Appl. No.: 18/507,032

(22) Filed: Nov. 11, 2023

(65) Prior Publication Data

US 2024/0076988 A1 Mar. 7, 2024

Related U.S. Application Data

(63) Continuation-in-part of application No. PCT/IB2022/052250, filed on Mar. 14, 2022.

(60) Provisional application No. 63/186,806, filed on May 11, 2021.

(51) Int. Cl.
*B29C 44/34* (2006.01)
*B29C 37/00* (2006.01)
*F01D 5/14* (2006.01)

(52) U.S. Cl.
CPC .......... *B29C 44/3411* (2013.01); *F01D 5/141* (2013.01); *B29C 2037/903* (2013.01); *F05D 2220/32* (2013.01); *F05D 2240/30* (2013.01); *F05D 2250/20* (2013.01); *F05D 2250/70* (2013.01); *Y10T 29/49337* (2015.01)

(58) Field of Classification Search
CPC .......... B29C 44/3411; B29C 2037/903; F01D 5/141; F01D 5/14; F01D 5/147; F01D 5/16; F05D 2220/32; F05D 2240/30; F05D 2250/20; F05D 2250/70; F05D 2260/96; F05D 2260/94; Y10T 29/49337
See application file for complete search history.

(56) References Cited

U.S. PATENT DOCUMENTS

| | | | | |
|---|---|---|---|---|
| 5,779,443 A | * | 7/1998 | Haller | F01D 9/02 415/914 |
| 7,500,299 B2 | * | 3/2009 | Dupeux | F01D 25/04 702/56 |
| 10,669,856 B1 | * | 6/2020 | Warner | F01D 5/141 |
| 2005/0249586 A1 | * | 11/2005 | Dupeux | F01D 5/10 415/119 |

(Continued)

FOREIGN PATENT DOCUMENTS

AU  2006235368 B2 * 11/2009 ......... F04D 15/0088

*Primary Examiner* — Brian Christopher Delrue

(57) ABSTRACT

A method for manufacturing a turbine blade comprising designing a turbine blade includes receiving initial geometrical and aerodynamic information of the turbine blade, obtaining the maximum amount of stress within a determined area of maximum stress, and obtaining a safety factor by dividing material yield stress of the turbine blade by the maximum amount of stress. The method further includes performing a first plurality of operations responsive to the safety factor being less than 1.5 and the determined area of maximum stress occurring at the junction of the blade airfoil and the blade root. The first plurality of operations includes creating a fillet at the junction of the blade airfoil and the blade root and increasing respective thickness of each airfoil slice of the plurality of airfoil slices with a distance from the junction of the blade airfoil and the blade root of no more than 15% of the blade airfoil length.

15 Claims, 7 Drawing Sheets

(56) References Cited

U.S. PATENT DOCUMENTS

| | | | |
|---|---|---|---|
| 2013/0280074 A1* | 10/2013 | Propheter-Hinckley | ................... |
| | | | B22F 10/28 |
| | | | 416/204 R |
| 2015/0354364 A1* | 12/2015 | Gallagher | ............. F04D 29/324 |
| | | | 416/223 A |
| 2017/0140091 A1* | 5/2017 | Okuno | ................... G06F 30/23 |
| 2022/0186622 A1* | 6/2022 | Lecuyer | ................... F01D 9/02 |
| 2024/0084707 A1* | 3/2024 | Lieu | ........................ F01D 5/282 |
| 2024/0160800 A1* | 5/2024 | Gromek | ................. G06F 30/17 |

* cited by examiner

BLADES OF AN AXIAL TURBINE

CROSS-REFERENCE TO RELATED APPLICATION

This application is a continuation-in-part of PCT/IB2022/052250, filed on Mar. 14, 2022, and entitled "BLADES OF AN AXIAL TURIBINE" which claims the benefit of priority from pending U.S. Provisional Patent Application Ser. No. 63/186,806, filed on May 11, 2021, and entitled "AERODYNAMIC-STRUCTURE MODIFICATION OF BLADES OF AN AXIAL TURBINE," which are both incorporated herein by reference in their entirety.

TECHNICAL FIELD

The present disclosure, generally, relates to designing and manufacturing a rotor blade for a turbine engine. Particularly, the present disclosure relates to designing and manufacturing hot and cold blades utilizing general properties of airfoil sections.

BACKGROUND

In addition to general criteria such as strength criterion, some critical aeroelastic problems involving flutter, forced response, and synchronous vibration may also affect the design criteria of advanced turbomachinery blades. Forced response and synchronous vibrations may originate from aerodynamic sources, whereas flutter instability may be caused by the interaction of the motion of the blades and the aerodynamic forces. All these phenomena, especially flutter, which may have a limit-cycle oscillation besides the oscillatory aerodynamic loading, may be arguably the most important factors in the design of durable blades.

The stress induced by flutter, forced response, and synchronous vibration may be confined to the minimum possible level even under resonance conditions, where the amplitude of the vibration may increase significantly and may usually be the main cause of high cycle fatigue failure. The flutter phenomenon as a root cause of failure in turbomachinery blades is still under investigation by many researchers.

From a design point of view, shrouds, clappers and dampers are coupling components that are commonly utilized in blade design to reduce or postpone the disturbance effects of dynamic phenomena, such as flutter, forced response, and synchronous vibration. Furthermore, geometric parameters such as the sweep angle and taper ratio may play a positive role in aerostructural modifications of advanced turbomachinery blades.

Generally, the shape of a blade may often be designed utilizing an optimization tool, such as multidisciplinary design optimization (MDO), which is a powerful method commonly applied to the design and optimization of turbomachinery components. However, in some cases such as designing and optimizing main blades in a first stage of an axial turbine or compressor, since flutter occurs in the main blades of the first stage, aeromechanical assessments in both stall and classical regions needs to be performed. Furthermore, in such cases, there is a need for developing a method that may allow for utilizing MDO, computational fluid dynamic, and finite element method to extract the best shape of the main blades.

There is further a need to develop a design and optimization process that may allow for utilizing taper ratio and sweep angle as the main geometric parameters in the design of the main blades. Furthermore, there is a need for developing a design and optimization method that may allow for considering structural considerations such as flutter speed prevention and setting a reasonable margin for forced response and steady-state stress.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for manufacturing a turbine blade. In an exemplary embodiment, the method may include designing a turbine blade. In an exemplary embodiment, designing the turbine blade may include receiving, at one or more processors, initial geometrical and aerodynamic information of the turbine blade.

In an exemplary embodiment, the turbine blade may include a blade airfoil attached to a rotor disk by utilizing a blade root. In an exemplary embodiment, the blade airfoil may be subdivided into a plurality of airfoil slices. In an exemplary embodiment, the plurality of airfoil slices may be stacked along a longitudinal axis of the blade airfoil.

In an exemplary embodiment, designing the turbine blade may further include determining, by the one or more processors, an area of maximum stress on the turbine blade by performing, by the one or more processors, a stress analysis on the turbine blade. In an exemplary embodiment, designing the turbine blade may further include obtaining, by the one or more processors, the maximum amount of stress within the determined area of maximum stress.

In an exemplary embodiment, designing the turbine blade may further include obtaining, by the one or more processors, a safety factor by dividing material yield stress of the turbine blade by the obtained maximum amount of stress. In an exemplary embodiment, designing the turbine blade may further include performing, by the one or more processors, a first plurality of operations responsive to the safety factor being less than 1.5 and the determined area of maximum stress occurring at the junction of the blade airfoil and the blade root. In an exemplary embodiment, the junction of the blade airfoil and the blade root may include an area on the blade airfoil at most 15% of the blade airfoil length away from the junction of the blade airfoil and the blade root.

In an exemplary embodiment, the first plurality of operations may include creating a fillet at the junction of the blade airfoil and the blade root. In an exemplary embodiment, the first plurality of operations may further include increasing respective thickness of each airfoil slice of the plurality of airfoil slices with a distance from the junction of the blade airfoil and the blade root of no more than 15% of the blade airfoil length. In an exemplary embodiment, the method may further include manufacturing the turbine blade by utilizing the designed turbine blade.

In an exemplary embodiment, designing the turbine blade may further include performing, by one or the more processors, a second plurality of operations responsive to the safety factor being less than 1.5 and the determined area of maximum stress occurring at an area on the blade between 15% and 100% of the blade airfoil length away from the junction of the blade airfoil and the blade root. In an exemplary embodiment, the second plurality of operations may include at least one of increasing respective thickness of a respective airfoil slice within the determined area of maximum stress and decreasing the maximum stress.

In an exemplary embodiment, decreasing the maximum stress may include shifting respective locations of upper airfoil slices along respective chord lines of the upper airfoil slices. In an exemplary embodiment, the upper airfoil slices may include airfoil slices of the plurality of airfoil slices located above the respective airfoil slice within the area of maximum stress. In an exemplary embodiment, decreasing the maximum stress may further include changing respective twist angles of the upper airfoil slices by an amount of at most 4° relative to respective initial twist angle for each airfoil slice of the plurality of airfoil slices.

In an exemplary embodiment, the respective initial twist angle for each airfoil slice of the plurality of airfoil slices may include a respective angle between an arbitrary reference coordinate system and a line connecting a proximal end of each slice of the plurality of airfoil slices to a distal end of each slice of the plurality of airfoil slices.

In an exemplary embodiment, creating the fillet may include creating a fillet at the junction of the blade airfoil and the blade root. In an exemplary embodiment, the fillet may have a radius in a range of 1 to 15 millimeters.

In an exemplary embodiment, increasing respective thickness of each airfoil slice of the plurality of airfoil slices may include increasing respective thickness of each airfoil slice of the plurality of airfoil slices by an amount in a range of 10 to 800 microns.

In an exemplary embodiment, shifting respective locations of the upper airfoil slices along respective chord lines of the upper airfoil slices may include calculating a respective distance between a respective surface center of each respective upper airfoil slice of the upper airfoil slices and the surface center of the airfoil slice within the area of maximum stress. In an exemplary embodiment, shifting respective locations of the upper airfoil slices along respective chord lines of the upper airfoil slices may further include minimizing the respective distance by shifting respective locations of the upper airfoil slices along respective chord lines of the upper airfoil slices.

In an exemplary embodiment, designing the turbine blade may further include performing, by the one or more processors, a third plurality of operations responsive to the safety factor being equal to 1.5. In an exemplary embodiment, the third plurality of operations may include at least one of determining natural frequencies and mode shapes of the turbine blade by performing, by the one or more processors, a modal analysis on the turbine blade at a working speed of the turbine and determining occurrence of frequency resonance within the turbine blade for up to the first three natural frequencies by utilizing Campbell diagram.

In an exemplary embodiment, designing the turbine blade may further include performing, by the one or more processors, a fourth plurality of operations responsive to the frequency resonance occurring at n<10 and only the first frequency comprising the resonance.

In an exemplary embodiment, the fourth plurality of operations may include at least one of increasing the radius of the fillet by up to 50%, increasing respective thicknesses of proximal airfoil slices of the blade airfoil by an amount in a range of 0 to 400 microns, and decreasing respective thicknesses of distal airfoil slices of the blade airfoil by an amount in a range of 0 to 400 microns.

In an exemplary embodiment, the proximal airfoil slices may include airfoil slices at most 15% of the blade airfoil length away from the junction of the blade airfoil and the blade root. In an exemplary embodiment, the distal airfoil slices may include airfoil slices at distances between 15% and 100% of the blade length away from the junction of the blade airfoil and the blade root. In an exemplary embodiment, respective thickness of each airfoil slice of the plurality of airfoil slices may decreases linearly from the junction of the blade airfoil and the blade root to a tip of the turbine blade.

In an exemplary embodiment, designing the turbine blade may further include performing, by the one or more processors, a fifth plurality of operations responsive to the frequency resonance occurring at n<10 and only the second frequency comprising the resonance.

In an exemplary embodiment, the fifth plurality of operations may include at least one of changing respective twist angles of the plurality of airfoil slices by an amount linearly increasing from −2° to 2° from a proximal end of the blade airfoil to a distal end of the blade airfoil, and shifting respective locations of the upper airfoil slices along respective chord lines of the upper airfoil slices. In an exemplary embodiment, the proximal end of the blade airfoil may include the junction of the blade airfoil and the blade root. In an exemplary embodiment, the distal end of the blade airfoil may include the tip of the turbine blade.

In an exemplary embodiment, designing the turbine blade may further include performing, by the one or more processors, a sixth plurality of operations responsive to the frequency resonance occurring at n<10 and both the first and the second frequencies comprising the resonance. In an exemplary embodiment, the sixth plurality of operations may include at least one of shifting respective locations of the upper airfoil slices along respective chord lines of the upper airfoil slices and increasing the radius of the fillet by up to 50%.

In an exemplary embodiment, designing the turbine blade may further include performing, by the one or more processors, the sixth plurality of operations responsive to the frequency resonance occurring at n<10 and the third frequency comprising the resonance.

In an exemplary embodiment, designing the turbine blade may further include calculating reduced frequency number for two modes of pure bending and pure torsion wherein the reduced frequency number defined by:

$$K = \frac{2\pi c\omega}{V_\infty}$$

wherein, K denotes reduced frequency, c denotes chord length, $\omega$ denotes natural frequency, and $V_\infty$ denotes impact velocity of a fluid at a leading edge of the blade.

In an exemplary embodiment, designing the turbine blade may further include performing, by the one or more processors, a fifth plurality of operations responsive to calculated K being between 0.3 and 0.5 for the pure torsion mode and calculated K being less than 0.8 for the pure bending mode. In an exemplary embodiment, the fifth plurality of operations may include at least one of adjusting the safety factor at a value equal to 1.5 by shifting respective locations of the upper airfoil slices along respective chord lines of the upper airfoil slices, increasing the radius of the fillet by up to 50%, increasing respective thicknesses of proximal airfoil slices of the blade airfoil by an amount in a range of 0 to 400 microns, and decreasing respective thicknesses of distal airfoil slices of the blade airfoil by an amount in a range of 0 to 400 microns.

In an exemplary embodiment, the proximal airfoil slices may include airfoil slices at most 15% of the blade airfoil length away from the junction of the blade airfoil and the blade root. In an exemplary embodiment, the distal airfoil slices may include airfoil slices at distances between 15% and 100% of the blade length away from the junction of the blade airfoil and the blade root. In an exemplary embodiment, respective thickness of each airfoil slice of the plurality of airfoil slices decreases linearly from the junction of the blade airfoil and the blade root to a tip of the turbine blade.

In an exemplary embodiment, designing the turbine blade may further include calculating reduced frequency number for two modes of pure bending and pure torsion, the reduced frequency number defined by:

$$K = \frac{2\pi c\omega}{V_\infty}$$

wherein, K denotes reduced frequency, c denotes chord length, $\omega$ denotes natural frequency, and $V_\infty$ denotes impact velocity of a fluid at a leading edge of the blade.

In an exemplary embodiment, designing the turbine blade may further include performing, by the one or more processors, a fifth plurality of operations responsive to calculated K not being between 0.3 and 0.5 for the pure torsion mode and calculated K being more than 0.8 for the pure bending mode, the fifth plurality of operations comprising changing respective twist angles of the airfoil slices by an amount linearly increasing from $-2°$ to $2°$ from a proximal end of the blade to a distal end of the blade. In an exemplary embodiment, the proximal end of the blade airfoil may include the junction of the blade airfoil and the blade root. In an exemplary embodiment, the distal end of the blade airfoil may include the tip of the turbine blade.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently exemplary embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as o its structure, organization, use and method of operation, together with further objectives and advantages thereof, will be better understood from the following discussion.

Figure 1:
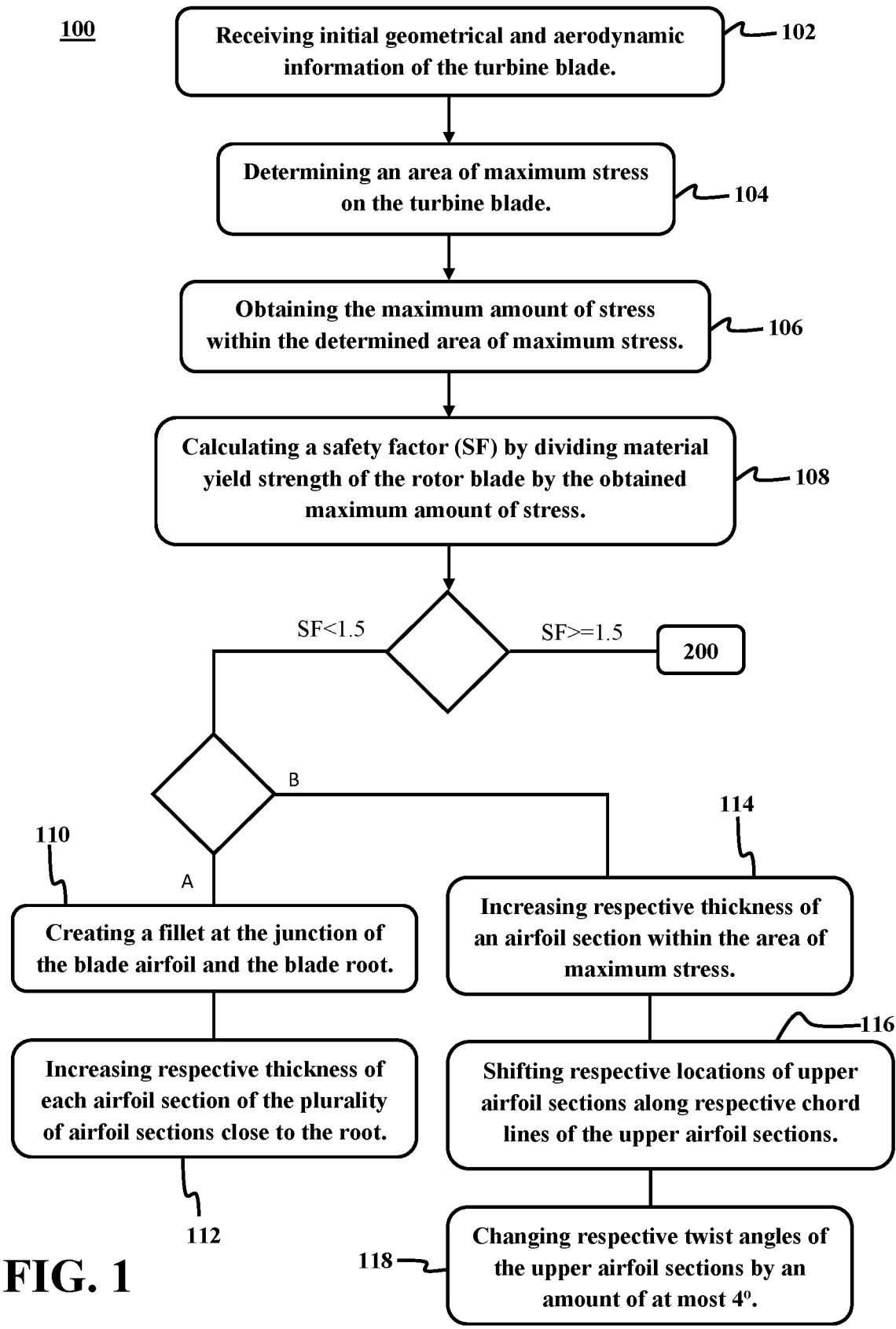
FIG. 1 illustrates a flow chart of a method for manufacturing a turbine blade, consistent with one or more exemplary embodiments of the present disclosure.

FIG. 1 illustrates a flow chart of a method 100 for manufacturing a turbine blade, consistent with one or more exemplary embodiments of the present disclosure. In an exemplary embodiment, method 100 may include a step 102 of receiving initial geometrical and aerodynamic information of the turbine blade, a step 104 of determining an area of maximum stress on the turbine blade by performing a stress analysis on the turbine blade, a step 106 of obtaining the maximum amount of stress within the determined area of maximum stress, and a step 108 of obtaining a safety factor by dividing material yield stress of the turbine blade by the obtained maximum amount of stress. In an exemplary embodiment, safety factor may be defined by Equation (1) below:

Safety Factor=(material yield stress)/(maximum amount of stress)   Equation (1)

Figure 4A:
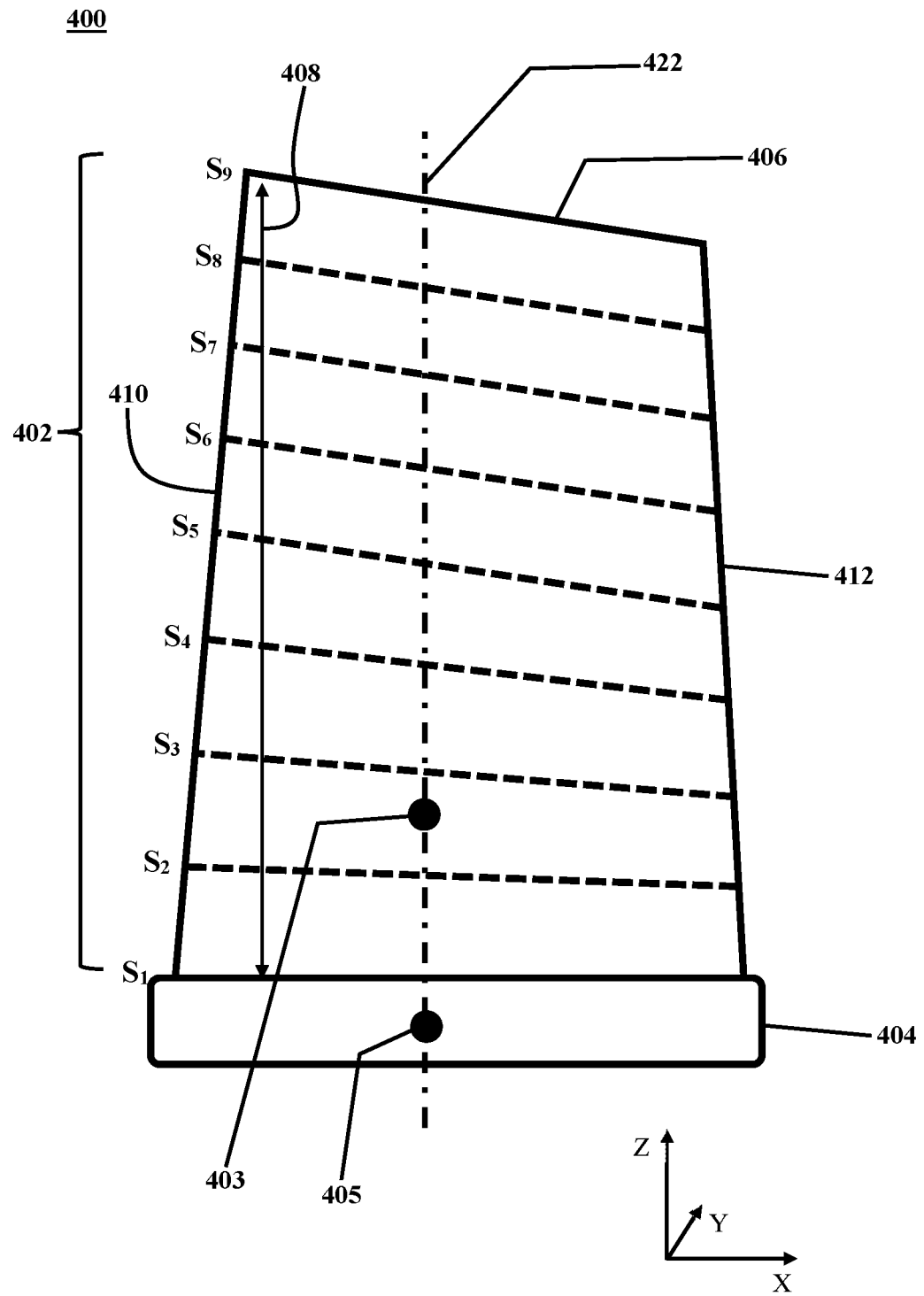
FIG. 4A illustrates a sectional view of a rotor blade, consistent with one or more exemplary embodiments of the present disclosure.

FIG. 4A illustrates a sectional view of a rotor blade 400, consistent with one or more exemplary embodiments of the present disclosure. In an exemplary embodiment, rotor blade 400 may include a blade airfoil 402 that may be attached to a blade root 404, where blade airfoil 402 may be subdivided into a plurality of airfoil slices, such as airfoil slices $S_1$-$S_9$. In an exemplary embodiment, rotor blade 400 may be mounted to a rotating component such as a turbine disk (not illustrated) by utilizing blade root 404. In an exemplary embodiment, rotor blade 400 may extend radially away from the turbine disk along blade airfoil 402, from blade root 404 to a tip 406 of blade airfoil 402. For example, blade airfoil 402 may be subdivided into a plurality of slices ($S_1$-$S_9$) that may be distributed at equal intervals along a span 408 of blade airfoil 402, from a root section $S_1$ to a tip section $S_9$. As used herein, a span height of an exemplary blade airfoil such as span 408 of blade airfoil 402 may be measured from an exemplary root section of blade airfoil 402 such as root section $S_1$ to an exemplary tip section of blade airfoil 402 such as tip section $S_9$. In an exemplary embodiment, blade airfoil 402 may extend radially from blade root 404 to tip 406, and axially from a leading edge 410 to a trailing edge 412.

Figure 4B:
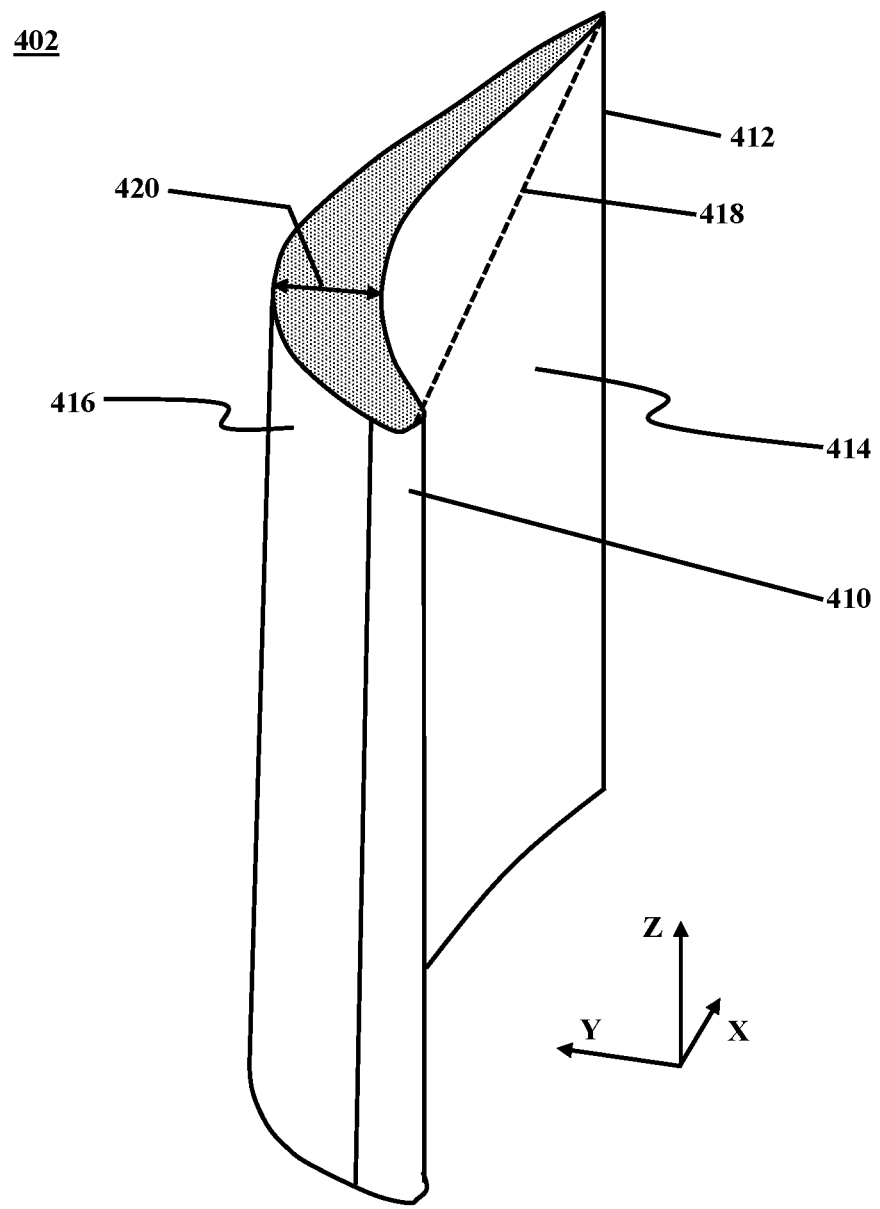
FIG. 4B illustrates a perspective view of a blade airfoil, consistent with one or more exemplary embodiments of the present disclosure.

FIG. 4B illustrates a perspective view of blade airfoil 402, consistent with one or more exemplary embodiments of the present disclosure. In an exemplary embodiment, blade airfoil 402 may be defined between a high-pressure surface 414 and a low-pressure surface 416 that may extend from leading edge 410 to trailing edge 412. In an exemplary embodiment, each airfoil section of exemplary airfoil sections of an exemplary blade airfoil may have a specific thickness and chord length. For example, airfoil section $S_9$ of plurality of airfoil sections ($S_1$-59) may have a chord length measured along a chord line 418 of airfoil section $S_9$ and a thickness 420. As used herein, a chord line may be defined as a straight line between a leading edge and a trailing edge of each airfoil section. For example, chord line 418 may refer to a straight line drawn between a leading edge and a trailing edge of airfoil section $S_9$.

In an exemplary embodiment, step 102 of receiving initial geometrical and aerodynamic information of the turbine blade may include receiving at least geometrical information of the turbine blade. In an exemplary embodiment, geometrical information of the turbine blade may include geometry and location of airfoil slices of the turbine blade that may be described in terms of Cartesian coordinates defined along X, Y, and Z axes. In an exemplary embodiment, as illustrates in FIGS. 4A and 4B, the X axis may be defined in a downstream axial direction, the Y axis may be defined in a circumferential or rotational direction, and the Z axis may be defined in radial direction. In an exemplary embodiment, location of airfoil slices may include corresponding position of airfoil slices along Z axis or span 408 of blade airfoil 402 and two dimensional stacking offsets determined by the position of a respective leading edge of each airfoil slice relative to blade root 404.

In an exemplary embodiment, step 102 of receiving initial geometrical and aerodynamic information of the turbine blade may further include receiving information regarding the material of construction of rotor blade 400. In an exemplary embodiment, blade airfoil 402 and blade root 404 may be formed either separately or integrally of a high strength, heat resistant material such as Ni-based or Co-based superalloys, or of a high temperature, stress-resistant composite material. In an exemplary embodiment, based at least on the received geometry and the received information regarding the material of construction, respective centers of gravity for blade airfoil 402 and blade root 404 may be determined. For example, blade airfoil 402 may have a center of gravity designated by reference numeral 403 and blade root 404 may have a center of gravity 405 that may be aligned with center of gravity 403 of blade airfoil 402. In an exemplary embodiment, a stacking line 422 may pass through both centers of gravity 403 and 405.

In an exemplary embodiment, step 102 of receiving initial geometrical and aerodynamic information of the turbine blade may further include receiving respective twist angle of each airfoil slice of the plurality of airfoil slices. As used herein, a respective twist angle of each airfoil slice is defined as an angle between the reference coordinate system and a respective chord line of each airfoil slice.

In an exemplary embodiment, step 102 of receiving initial geometrical and aerodynamic information of the turbine blade may further include receiving working conditions of an exemplary turbine, such as temperature and pressure at each airfoil slice of the plurality of airfoil slices of an exemplary rotor blade. In addition, working speed of the turbine rotor may further be received in step 102.

In an exemplary embodiment, step 104 of determining the area of maximum stress on the turbine blade may include applying stress analysis on an assembly of the rotor blade and the turbine disk at a given working speed of the turbine. The maximum stress occurs due to aerodynamic force and centrifugal force acting on the rotor blade.

In an exemplary embodiment, method 100 may proceed to at least one of steps 110 and 112 responsive to the calculated safety factor in step 108 being less than 1.5 and the determined area of maximum stress in step 104 occurring at an area close to the blade root (the condition designated by letter A in FIG. 1). As used herein, an area close to the blade root may include an area on the blade airfoil between the blade root and at most 15% of the blade airfoil length away from the junction of the blade airfoil and the blade root. In an exemplary embodiment, step 110 may include creating a fillet at the junction of the blade airfoil and the blade root and step 112 may include increasing respective thickness of each airfoil slice of the plurality of airfoil slices within the area close to the blade root.

Figure 5:
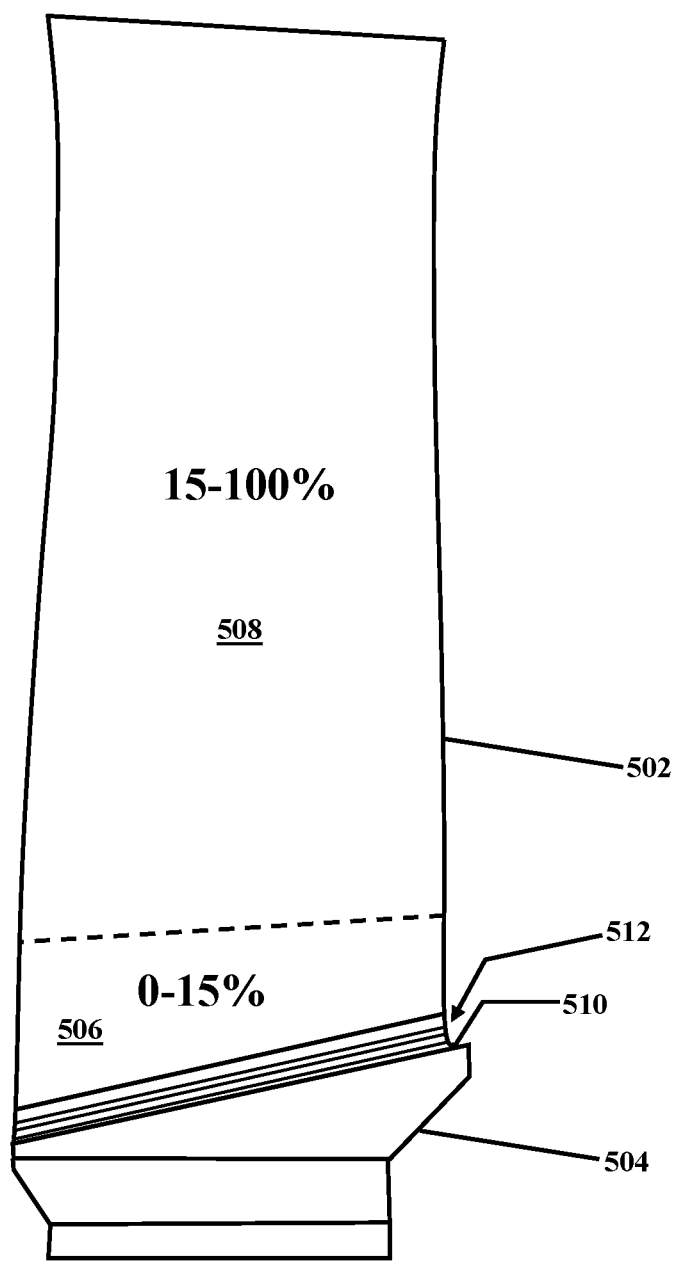
FIG. 5 illustrates a side-view of a rotor blade, consistent with one or more exemplary embodiments of the present disclosure.

FIG. 5 illustrates a side-view of a rotor blade 500, consistent with one or more exemplary embodiments of the present disclosure. In an exemplary embodiment, rotor blade 500 may be similar to rotor blade 400 and may include a blade airfoil 502 similar to blade airfoil 502 that may be attached to or integrally formed with a blade root 504 similar to blade root 504. In an exemplary embodiment, blade airfoil 502 may be divided into an area 506 close to blade root 504 as defined in the previous paragraph and an area 508 away from blade root 504. Specifically, area 506 close to blade root 504 is defined as an area between blade root 504 and at most 15% of blade airfoil 502 length away from junction 510 of blade airfoil 502 and blade root 504. In addition, area 508 away from blade root 504 is defined as an area between 15% and 100% of blade airfoil 502 length away from junction 510.

In an exemplary embodiment, method 100 may proceed to at least one of steps 110 and 112 responsive to the calculated safety factor in step 108 being less than 1.5 and the determined area of maximum stress in step 104 occurring at area 506 close to blade root 504. In an exemplary embodiment, step 110 of creating the fillet at the junction of the blade airfoil and the blade root may include creating a fillet such as fillet 512 at junction 510 of blade airfoil 502 and blade root 504. For example, fillet 512 may be created by rounding junction 510 of blade airfoil 502 and blade root 504 with a radius in a range of 1 mm to 15 mm.

In an exemplary embodiment, step 112 may include increasing respective thickness of each airfoil slice of the plurality of airfoil slices within area 506 close to blade root 504. In an exemplary embodiment, respective thickness of each airfoil slice of the plurality of airfoil slices within area 506 may be increased by an amount in a range of 10 to 800 microns.

In an exemplary embodiment, method 100 may proceed to at least one of steps 114, 116, and 118 responsive to the calculated safety factor in step 108 being less than 1.5 and the determined area of maximum stress in step 104 occurring at an area on the blade away from the blade root (the condition designated by letter B in FIG. 1). As used herein, an area way from the blade root may include an area between 15% and 100% of the blade airfoil length away from the junction of the blade airfoil and the blade root similar to area 508.

In an exemplary embodiment, step 114 may include increasing respective thickness of a respective airfoil slice within the determined area of maximum stress, step 116 may include shifting respective locations of upper airfoil slices along respective chord lines of the upper airfoil slices, and step 118 may include changing respective twist angles of the upper airfoil slices by an amount of at most 4°. As used herein, upper airfoil slices may refer to airfoil slices of the plurality of airfoil slices located above the respective airfoil slice within the area of maximum stress.

In an exemplary embodiment, step 114 may include increasing the thickness of the airfoil slice within the determined area of maximum stress by an amount up to 800 microns. For example, responsive to airfoil slice $S_5$ being determined to be in the area of maximum stress, the thickness of airfoil slice $S_5$ may be increased by an amount up to 800 microns. As used herein, the thickness of a respective airfoil slice is measured along the Y axis, such as thickness 420 as illustrated in FIG. 4B.

In an exemplary embodiment, step 116 may include shifting respective locations of upper airfoil slices along respective chord lines of the upper airfoil slices to align surface centers of the upper airfoil slices with the surface center of the airfoil slice within the area of maximum stress. For example, responsive to airfoil slice $S_5$ being determined to be in the area of maximum stress, respective locations of upper airfoil slices $S_6$-$S_9$ may be shifted along respective chord lines of upper airfoil slices $S_6$-$S_9$. In an exemplary embodiment, shifting respective locations of the upper airfoil slices may be limited to axial boundary of blade root 504. In an exemplary embodiment, step 116 may include shifting respective locations of upper airfoil slices along respective chord lines of the upper airfoil slices to the point where the amount of stress within the area with maximum amount of stress is reduced by at least 20%.

In an exemplary embodiment, step 116 may include shifting respective locations of upper airfoil slices along respective chord lines of the upper airfoil slices may include calculating a respective distance between a respective surface center of each respective upper airfoil slice of the upper airfoil slices and the surface center of the airfoil slice within the area of maximum stress, and minimizing the respective distance by shifting respective locations of the upper airfoil slices along respective chord lines of the upper airfoil slices.

In an exemplary embodiment, step 118 may include changing respective twist angles of the upper airfoil slices by an amount of at most 4° relative to the initial twist angles of the upper airfoil slices. For example, responsive to airfoil slice $S_5$ being determined to be in the area of maximum stress, respective twist angles of upper airfoil slices $S_6$-59 may be changed by an amount of at most 4° relative to the initial twist angles of upper airfoil slices $S_6$-59.

In an exemplary embodiment, responsive to achieving a safety factor equal to 1.5 by performing method 100, a method 200 may be performed to eliminate frequency resonance occurrence within the rotor blade within a working speed range of the turbine. As used herein, the working speed range may refer to a range including ±%5 of the working speed of the turbine.

Figure 2:
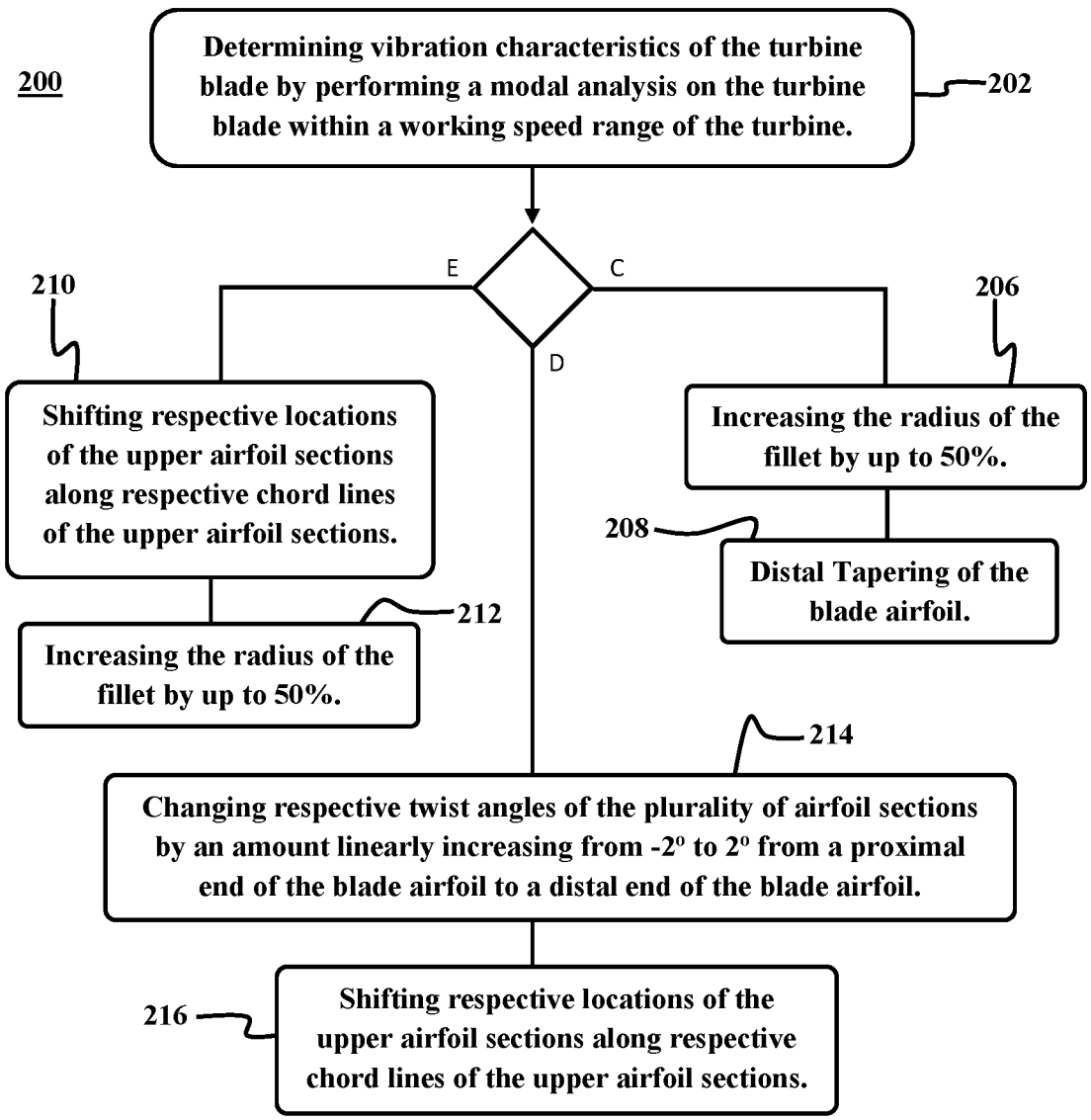
FIG. 2 illustrates a flowchart of a method for eliminating frequency resonance occurrence within the rotor blade, consistent with one or more exemplary embodiments of the present disclosure.

FIG. 2 illustrates a flowchart of method 200 for eliminating frequency resonance occurrence within the rotor blade, consistent with one or more exemplary embodiments of the present disclosure. In an exemplary embodiment, method 200 may include a step 202 of determining vibration characteristics of the turbine blade by performing a modal analysis on the turbine blade within a working speed range of the turbine. As used herein, the vibration characteristics of an exemplary rotor blade may include natural frequencies and mode shapes of an exemplary rotor blade.

In an exemplary embodiment, step 202 of determining vibration characteristics of the turbine blade may include determining occurrence of frequency resonance within the turbine blade due to an external excitation force for up to the first three natural frequencies by utilizing Campbell diagram. In an exemplary embodiment, determining occurrence of frequency resonance within the turbine blade due to an external excitation force may include determining if natural frequency of an exemplary rotor blade and excitation frequency due to aerodynamic force are equal. The excitation frequency of the aerodynamic force is a parameter that is directly proportional with working rpm and natural multiples (n) of working rpm.

In an exemplary embodiment, method 200 may proceed to at least one of steps 206 and 208 responsive to the frequency resonance occurring at n<10 and only the first natural frequency comprising the resonance (the condition designated by letter C in FIG. 2). In an exemplary embodiment, step 206 may include increasing the radius of the fillet by up to 50%. In an exemplary embodiment, step 208 may include distal tapering of the blade airfoil. In an exemplary embodiment, the distal tapering of the blade airfoil may include increasing respective thicknesses of proximal airfoil slices of the blade airfoil by an amount in a range of 0 to 400 microns. In an exemplary embodiment, the proximal airfoil slices may refer to airfoil slices at most 15% of the blade airfoil length away from the junction of the blade airfoil and the blade root.

In an exemplary embodiment, the distal tapering of the blade airfoil may further include decreasing respective thicknesses of distal airfoil slices of the blade airfoil by an amount in a range of 0 to 400 microns. In an exemplary embodiment, the distal airfoil slices may refer to airfoil slices at distances between 15% and 100% of the blade length away from the junction of the blade airfoil and the blade root. In an exemplary embodiment, during the distal tapering of the blade airfoil, respective thickness of each airfoil slice of the plurality of airfoil slices decreases linearly from the junction of the blade airfoil and the blade root to a tip of the turbine blade.

In an exemplary embodiment, method 200 may proceed to at least one of steps 214 and 216 responsive to the frequency resonance occurring at n<10 and only the second frequency comprising the resonance (the condition designated by letter D in FIG. 2). In an exemplary embodiment, step 214 may include changing respective twist angles of the plurality of airfoil slices by an amount linearly increasing from −2° to 2° from a proximal end of the blade airfoil to a distal end of the blade airfoil and step 216 may include shifting respective locations of the upper airfoil slices along respective chord lines of the upper airfoil slices.

In an exemplary embodiment, method 200 may proceed to at least one of steps 210 and 212 responsive to the frequency resonance occurring at n<10 and both the first and the second frequencies comprising the resonance (the condition designated by letter E in FIG. 2). In an exemplary embodiment, step 210 may include shifting respective locations of the upper airfoil slices along respective chord lines of the upper airfoil slices and step 212 may include increasing the radius of the fillet by up to 50%.

In an exemplary embodiment, method 200 may proceed to at least one of steps 210 and 212 responsive to the frequency resonance occurring at n<10 and the third frequency comprising the resonance (the condition designated by letter E in FIG. 2).

Figure 3:
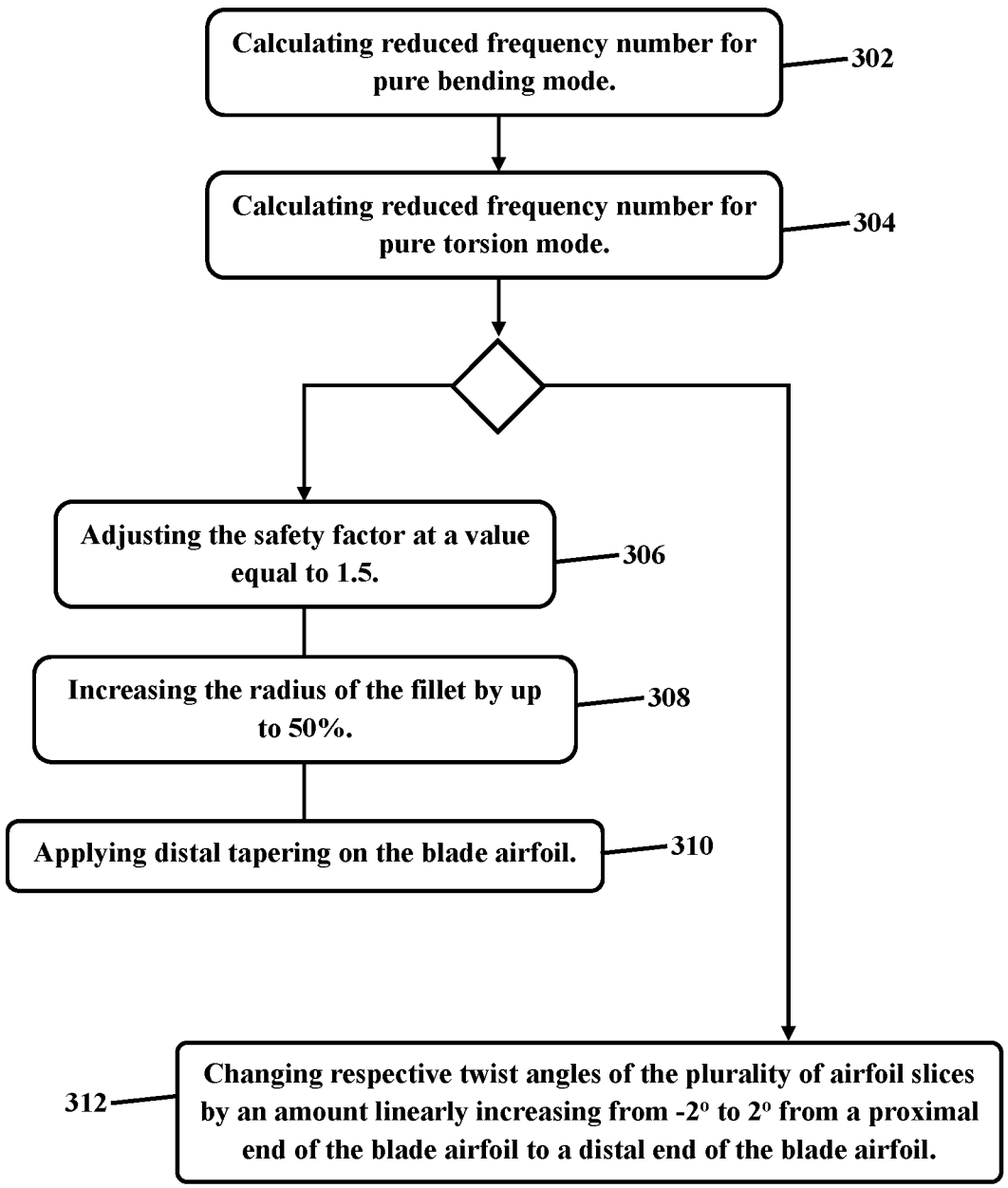
FIG. 3 illustrates a method for reducing the chance of flutter occurrence within a rotor blade, consistent with one or more exemplary embodiments of the present disclosure.

FIG. 3 illustrates a method 300 for reducing the chance of flutter occurrence within the rotor blade, consistent with one or more exemplary embodiments of the present disclosure. In an exemplary embodiment, method 300 may include a step 302 of calculating reduced frequency number for pure bending mode and a step 304 of calculating reduced frequency number for pure torsion mode.

In an exemplary embodiment, method 300 may proceed to at least one of steps 306, 308, and 310 responsive to the calculated reduced frequency number in step 302 for pure bending mode being less than 0.8 and the calculated reduced frequency number in step 304 for pure torsion mode being between 0.3 and 0.5. In an exemplary embodiment, reduced frequency number may be calculated by equation (1) below:

$$K = \frac{2\pi c \omega}{V_\infty} \qquad \text{Equation (1)}$$

In Equation (1) above, K denotes reduced frequency, c denotes chord length, $\omega$ denotes natural frequency, and $V_\infty$ denotes impact velocity of a fluid at a leading edge of the blade.

In an exemplary embodiment, step 306 may include adjusting the safety factor at a value equal to 1.5 by shifting respective locations of the upper airfoil slices along respective chord lines of the upper airfoil slices. In an exemplary embodiment, step 308 may include increasing the radius of the fillet by up to 50%. In an exemplary embodiment, step 310 may include applying distal tapering on the blade airfoil by increasing respective thicknesses of proximal airfoil slices of the blade airfoil by an amount in a range of 0 to 400 microns and decreasing respective thicknesses of distal airfoil slices of the blade airfoil by an amount in a range of 0 to 400 microns.

In an exemplary embodiment, method 300 may proceed to step 312 responsive to the calculated reduced frequency number in step 302 for pure bending mode being more than 0.8 and the calculated reduced frequency number in step 304 for pure torsion mode not being between 0.3 and 0.5. In an exemplary embodiment, step 312 may include changing respective twist angles of the airfoil slices by an amount linearly increasing from $-2°$ to $2°$ from a proximal end of the blade to a distal end of the blade. As used herein, the proximal end of the blade airfoil may include the junction of the blade airfoil and the blade root, and the distal end of the blade airfoil may include the tip of the turbine blade.

Figure 6:
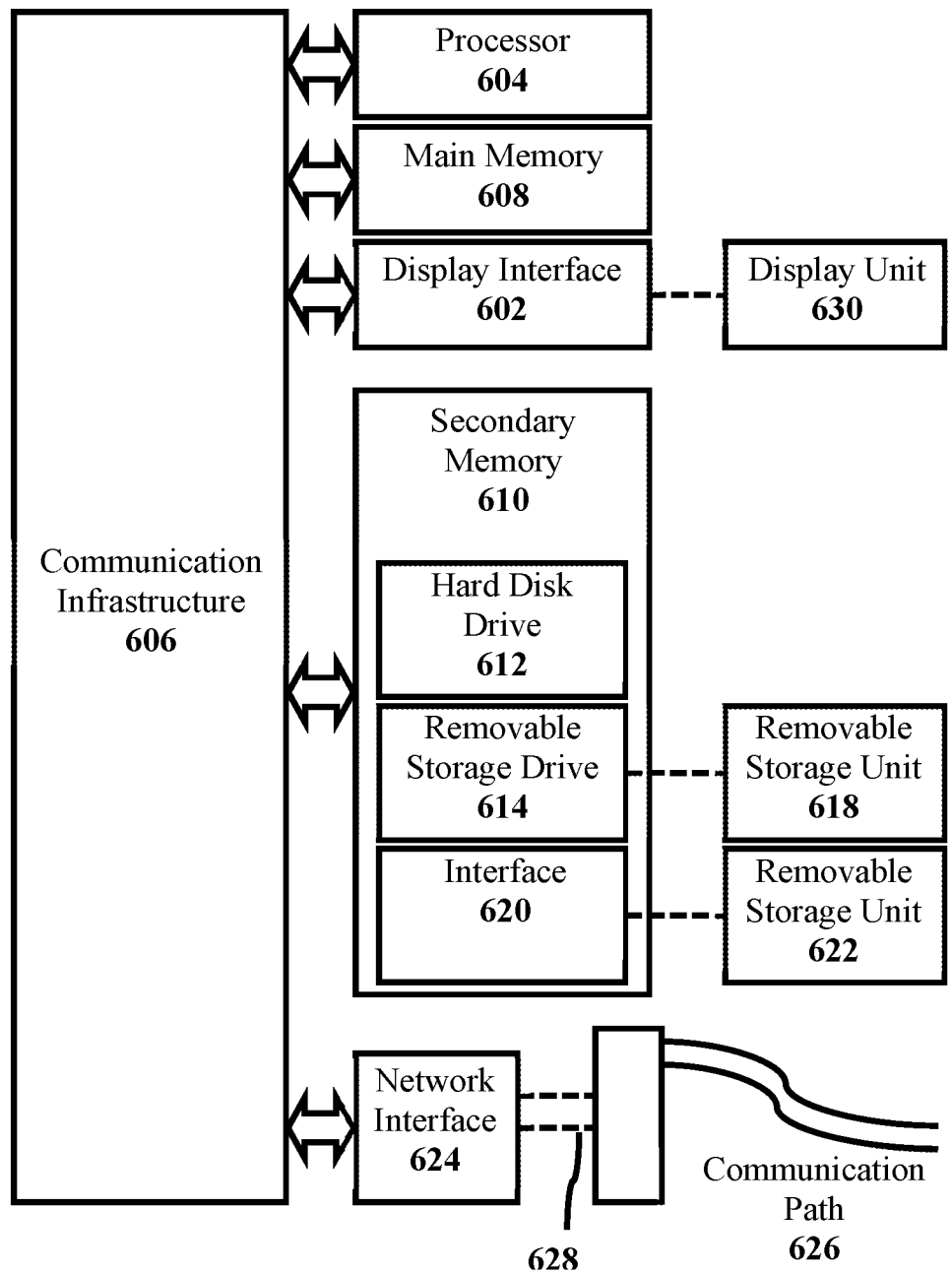
FIG. 6 illustrates an exemplary embodiment of a processing unit in which an exemplary embodiment of the present disclosure, or portions thereof, may be implemented as computer-readable code, consistent with one or more exemplary embodiments of the present disclosure.

FIG. 6 shows an exemplary embodiment of processing unit 600 in which an exemplary embodiment of the present disclosure, or portions thereof, may be implemented as computer-readable code, consistent with one or more exemplary embodiments of the present disclosure. For example, some processes related to methods of the present application may be implemented in processing unit 600 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that an exemplary embodiment of the disclosed subject matter can be practiced with various computer system configurations, including multi-core multiprocessor systems, minicomputers, mainframe computers, computers linked or clustered with distributed functions, as well as microcontrollers, pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An exemplary embodiment of the present disclosure is described in terms of this example processing unit 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general-purpose processor device. As will be appreciated by persons skilled in the relevant art, processor device 604 may also be a single processor in a multi-core/multiprocessor system, such system operating alone, or in a cluster of computing devices operating in a cluster or server farm. In an exemplary embodiment, processor device 604 may be connected to a communication infrastructure 606, for example, a bus, message queue, network, or multi-core message-passing scheme.

In an exemplary embodiment, processing unit 600 may also include a main memory 608, for example, random access memory (RAM), and may also include a secondary memory 610. In an exemplary embodiment, secondary memory 610 may include a hard disk drive 612, and a removable storage drive 614. In an exemplary embodiment, removable storage drive 614 may include a floppy disk drive, a magnetic tape drive, an optical disk drive, a flash memory, or the like. In addition, removable storage drive 614 may read from and/or write to a removable storage unit 618 in a well-known manner. In an exemplary embodiment, removable storage unit 618 may include a floppy disk, magnetic tape, optical disk, etc., which may be read by and written to by removable storage drive 614. As will be appreciated by persons skilled in the relevant art, removable storage unit 618 may include a computer usable storage medium having stored therein computer software and/or data.

In alternative implementations, secondary memory 610 may include other similar means for allowing computer programs or other instructions to be loaded into processing unit. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from removable storage unit 622 to processing unit 600.

In an exemplary embodiment, processing unit 600 may also include a communications interface 624. Communications interface 624 may allow software and data to be transferred between processing unit 600 and external devices. In an exemplary embodiment, communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. In an exemplary embodiment, communications path 626 may carry signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

In some exemplary embodiment, computer programs (also called computer control logic) may be stored in main memory 608 and/or secondary memory 610. Computer programs may also be received via communications interface 624. Such computer programs, when executed, enable processing unit 600 to implement the present disclosure as discussed herein. In particular, the computer programs, when executed, may enable processor device 604 to implement the processes of the present disclosure. Accordingly, such computer programs represent controllers of processing unit 600. Where the present disclosure is implemented using software, the software may be stored in a computer program product and loaded into processing unit 600 using removable storage drive 614, interface 620, and hard disk drive 612, or communications interface 624.

Embodiments of the present disclosure may also be directed to computer program products including software stored on any computer useable medium. Such software, when executed in one or more data processing devices, causes a data processing device(s) to operate as described herein. An exemplary embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for manufacturing a turbine blade, the method comprising:

designing a turbine blade by:

receiving, at one or more processors, initial geometrical and aerodynamic information of the turbine blade, the turbine blade comprising a blade airfoil attached to a rotor disk by utilizing a blade root, the blade airfoil subdivided into a plurality of airfoil slices, the plurality of airfoil slices stacked along a longitudinal axis of the blade airfoil;

determining, by the one or more processors, an area of maximum stress on the turbine blade by performing, by the one or more processors, a stress analysis on the turbine blade;

obtaining, by the one or more processors, the maximum amount of stress within the determined area of maximum stress;

obtaining, by the one or more processors, a safety factor by dividing material yield stress of the turbine blade by the obtained maximum amount of stress; and performing, by the one or more processors, a first plurality of operations responsive to the safety factor being less than 1.5 and the determined area of maximum stress occurring at the junction of the blade airfoil and the blade root, the junction of the blade airfoil and the blade root comprising an area on the blade airfoil equal to 15% of the blade airfoil length away from the junction of the blade airfoil and the blade root, the first plurality of operations comprising:

creating a fillet at the junction of the blade airfoil and the blade root by creating a fillet at the junction of the blade airfoil and the blade root, the fillet comprising a radius in a range of 15 millimeters; and increasing respective thickness of each airfoil slice of the plurality of airfoil slices with a distance from the junction of the blade airfoil and the blade root equal to 15% of the blade airfoil length by increasing respective thickness of each airfoil slice of the plurality of airfoil slices by an amount of 800 microns;

performing, by the one or more processors, a second plurality of operations responsive to the safety factor being less than 1.5 and the determined area of maximum stress occurring at an area on the blade between 15% and 100% of the blade airfoil length away from the junction of the blade airfoil and the blade root, the second plurality of operations comprising at least one of:

increasing respective thickness of a respective airfoil slice within the determined area of maximum stress;

decreasing the maximum stress by:

shifting respective locations of upper airfoil slices along respective chord lines of the upper airfoil slices by calculating a respective distance between a respective surface center of each respective upper airfoil slice of the upper airfoil slices and the surface center of the airfoil slice within the area of maximum stress and minimizing the respective distance by shifting respective locations of the upper airfoil slices along respective chord lines of the upper airfoil slices, the upper airfoil slices comprising airfoil slices of the plurality of airfoil slices located above the respective airfoil slice within the area of maximum stress; and changing respective twist angles of the upper airfoil slices by an amount of 4° relative to respective initial twist angle for each airfoil slice of the plurality of airfoil slices, the respective initial twist angle for each airfoil slice of the plurality of airfoil slices comprising a respective angle between an arbitrary reference coordinate system and a line connecting a proximal end of each slice of the plurality of airfoil slices to a distal end of each slice of the plurality of airfoil slices;

performing, by the one or more processors, a third plurality of operations responsive to the safety factor being equal to 1.5, the third plurality of operations comprising at least one of:

determining natural frequencies and mode shapes of the turbine blade by performing, by the one or more processors, a modal analysis on the turbine blade at a working speed of the turbine;

determining occurrence of frequency resonance within the turbine blade for up to the first three natural frequencies by utilizing Campbell diagram;

performing, by the one or more processors, a fourth plurality of operations responsive to the frequency resonance occurring at n<10 and only the first frequency comprising the resonance, the fourth plurality of operations comprising at least one of:

increasing the radius of the fillet by 50%;

increasing respective thicknesses of proximal airfoil slices of the blade airfoil by an amount of 400 microns, the proximal airfoil slices comprising airfoil slices equal to 15% of the blade airfoil length away from the junction of the blade airfoil and the blade root; and decreasing respective thicknesses of distal airfoil slices of the blade airfoil by an amount of 400 microns, the distal airfoil slices comprising airfoil slices at distances between 15% and 100% of the blade length away from the junction of the blade airfoil and the blade root, respective thickness of each airfoil slice of the plurality of airfoil slices decreasing linearly from the junction of the blade airfoil and the blade root to a tip of the turbine blade;

performing, by the one or more processors, a fifth plurality of operations responsive to the frequency resonance occurring at n<10 and only the second frequency comprising the resonance, the fifth plurality of operations comprising at least one of:

changing respective twist angles of the plurality of airfoil slices by an amount linearly increasing from −2° to 2° from a proximal end of the blade airfoil to a distal end of the blade airfoil, the proximal end of the blade airfoil comprising the junction of the blade airfoil and the blade root, the distal end of the blade airfoil comprising the tip of the turbine blade; and shifting respective locations of the upper airfoil slices along respective chord lines of the upper airfoil slices;

performing, by the one or more processors, a sixth plurality of operations responsive to the frequency resonance occurring at n<10 and both the first and the second frequencies comprising the resonance, the sixth plurality of operations comprising at least one of:

shifting respective locations of the upper airfoil slices along respective chord lines of the upper airfoil slices; and increasing the radius of the fillet by 50%;

calculating reduced frequency number for two modes of pure bending and pure torsion, the reduced frequency number defined by:

$$K = \frac{2\pi c \omega}{V_\infty}$$

wherein, K denotes reduced frequency, c denotes chord length, $\omega$ denotes natural frequency, and $V_\infty$ denotes impact velocity of a fluid at a leading edge of the blade;

performing, by the one or more processors, a fifth plurality of operations responsive to calculated K being between 0.3 and 0.5 for the pure torsion mode and calculated K being less than 0.8 for the pure bending mode, the fifth plurality of operations comprising at least one of:

adjusting the safety factor at a value equal to 1.5 by shifting respective locations of the upper airfoil slices along respective chord lines of the upper airfoil slices;

increasing the radius of the fillet by 50%;

increasing respective thicknesses of proximal airfoil slices of the blade airfoil by an amount in of 400 microns, the proximal airfoil slices comprising airfoil slices at most 15% of the blade airfoil length away from the junction of the blade airfoil and the blade root; and decreasing respective thicknesses of distal airfoil slices of the blade airfoil by an amount of 400 microns, the distal airfoil slices comprising airfoil slices at distances between 15% and 100% of the blade length away from the junction of the blade airfoil and the blade root, respective thickness of each airfoil slice of the plurality of airfoil slices decreasing linearly from the junction of the blade airfoil and the blade root to a tip of the turbine blade; and manufacturing the turbine blade by utilizing the designed turbine blade.

2. A method for manufacturing a turbine blade, the method comprising:

designing a turbine blade by:

receiving, at one or more processors, initial geometrical and aerodynamic information of the turbine blade, the turbine blade comprising a blade airfoil attached to a rotor disk by utilizing a blade root, the blade airfoil subdivided into a plurality of airfoil slices, the plurality of airfoil slices stacked along a longitudinal axis of the blade airfoil;

determining, by the one or more processors, an area of maximum stress on the turbine blade by performing, by the one or more processors, a stress analysis on the turbine blade;

obtaining, by the one or more processors, the maximum amount of stress within the determined area of maximum stress;

obtaining, by the one or more processors, a safety factor by dividing material yield stress of the turbine blade by the obtained maximum amount of stress; and performing, by the one or more processors, a first plurality of operations responsive to the safety factor being less than 1.5 and the determined area of maximum stress occurring at the junction of the blade airfoil and the blade root, the junction of the blade airfoil and the blade root comprising an area on the blade airfoil at most 15% of the blade airfoil length away from the junction of the blade airfoil and the blade root, the first plurality of operations comprising:

creating a fillet at the junction of the blade airfoil and the blade root; and increasing respective thickness of each airfoil slice of the plurality of airfoil slices with a distance from the junction of the blade airfoil and the blade root of no more than 15% of the blade airfoil length; and manufacturing the turbine blade by utilizing the designed turbine blade.

3. The method of claim 2, wherein designing the turbine blade further comprises performing, by one or the more processors, a second plurality of operations responsive to the safety factor being less than 1.5 and the determined area of maximum stress occurring at an area on the blade between 15% and 100% of the blade airfoil length away from the junction of the blade airfoil and the blade root, the second plurality of operations comprising at least one of:

increasing respective thickness of a respective airfoil slice within the determined area of maximum stress;

decreasing the maximum stress by:
shifting respective locations of upper airfoil slices along respective chord lines of the upper airfoil slices, the upper airfoil slices comprising airfoil slices of the plurality of airfoil slices located above the respective airfoil slice within the area of maximum stress; and changing respective twist angles of the upper airfoil slices by an amount of at most 4° relative to respective initial twist angle for each airfoil slice of the plurality of airfoil slices.

4. The method of claim 3, wherein the respective initial twist angle for each airfoil slice of the plurality of airfoil slices comprises a respective angle between an arbitrary reference coordinate system and a line connecting a proximal end of each slice of the plurality of airfoil slices to a distal end of each slice of the plurality of airfoil slices.

5. The method of claim 4, wherein creating the fillet comprises creating a fillet at the junction of the blade airfoil and the blade root, wherein the fillet has a radius in a range of 1 to 15 millimeters.

6. The method of claim 5, wherein increasing respective thickness of each airfoil slice of the plurality of airfoil slices comprises increasing respective thickness of each airfoil slice of the plurality of airfoil slices by an amount in a range of 10 to 800 microns.

7. The method of claim 6, wherein shifting respective locations of the upper airfoil slices along respective chord lines of the upper airfoil slices comprises:

calculating a respective distance between a respective surface center of each respective upper airfoil slice of the upper airfoil slices and the surface center of the airfoil slice within the area of maximum stress; and minimizing the respective distance by shifting respective locations of the upper airfoil slices along respective chord lines of the upper airfoil slices.

8. The method of claim 7, wherein designing the turbine blade further comprises performing, by the one or more processors, a third plurality of operations responsive to the safety factor being equal to 1.5, the third plurality of operations comprising at least one of:

determining natural frequencies and mode shapes of the turbine blade by performing, by the one or more processors, a modal analysis on the turbine blade at a working speed of the turbine;

determining occurrence of frequency resonance within the turbine blade for up to the first three natural frequencies by utilizing Campbell diagram.

9. The method of claim 8, wherein designing the turbine blade further comprises performing, by the one or more processors, a fourth plurality of operations responsive to the frequency resonance occurring at n<10 and only the first frequency comprising the resonance, the fourth plurality of operations comprising at least one of:

increasing the radius of the fillet by up to 50%;

increasing respective thicknesses of proximal airfoil slices of the blade airfoil by an amount in a range of 0 to 400 microns, the proximal airfoil slices comprising airfoil slices at most 15% of the blade airfoil length away from the junction of the blade airfoil and the blade root; and decreasing respective thicknesses of distal airfoil slices of the blade airfoil by an amount in a range of 0 to 400 microns, the distal airfoil slices comprising airfoil slices at distances between 15% and 100% of the blade length away from the junction of the blade airfoil and the blade root, wherein respective thickness of each airfoil slice of the plurality of airfoil slices decreases linearly from the junction of the blade airfoil and the blade root to a tip of the turbine blade.

10. The method of claim 9, wherein designing the turbine blade further comprises performing, by the one or more processors, a fifth plurality of operations responsive to the frequency resonance occurring at n<10 and only the second frequency comprising the resonance, the fifth plurality of operations comprising at least one of:

changing respective twist angles of the plurality of airfoil slices by an amount linearly increasing from −2° to 2° from a proximal end of the blade airfoil to a distal end of the blade airfoil, the proximal end of the blade airfoil comprising the junction of the blade airfoil and the blade root, the distal end of the blade airfoil comprising the tip of the turbine blade; and shifting respective locations of the upper airfoil slices along respective chord lines of the upper airfoil slices.

11. The method of claim 10, wherein designing the turbine blade further comprises performing, by the one or more processors, a sixth plurality of operations responsive to the frequency resonance occurring at n<10 and both the first and the second frequencies comprising the resonance, the sixth plurality of operations comprising at least one of:

shifting respective locations of the upper airfoil slices along respective chord lines of the upper airfoil slices; and increasing the radius of the fillet by up to 50%.

12. The method of claim 11, wherein designing the turbine blade further comprises performing, by the one or more processors, the sixth plurality of operations responsive to the frequency resonance occurring at n<10 and the third frequency comprising the resonance.

13. The method of claim 8, wherein designing the turbine blade further comprises:

calculating reduced frequency number for two modes of pure bending and pure torsion, the reduced frequency number defined by:

$$K = \frac{2\pi c \omega}{V_\infty}$$

wherein, K denotes reduced frequency, c denotes chord length, ω denotes natural frequency, and $V_\infty$ denotes impact velocity of a fluid at a leading edge of the blade;

performing, by the one or more processors, a fifth plurality of operations responsive to calculated K being between 0.3 and 0.5 for the pure torsion mode and calculated K being less than 0.8 for the pure bending mode, the fifth plurality of operations comprising at least one of:

adjusting the safety factor at a value equal to 1.5 by shifting respective locations of the upper airfoil slices along respective chord lines of the upper airfoil slices;

increasing the radius of the fillet by up to 50%;

increasing respective thicknesses of proximal airfoil slices of the blade airfoil by an amount in a range of 0 to 400 microns, the proximal airfoil slices comprising airfoil slices at most 15% of the blade airfoil length away from the junction of the blade airfoil and the blade root; and decreasing respective thicknesses of distal airfoil slices of the blade airfoil by an amount in a range of 0 to 400 microns, the distal airfoil slices comprising airfoil slices at distances between 15% and 100% of the blade length away from the junction of the blade airfoil and the blade root, wherein respective thickness of each airfoil slice of the plurality of airfoil slices decreases linearly from the junction of the blade airfoil and the blade root to a tip of the turbine blade.

14. The method of claim 8, wherein designing the turbine blade further comprises:

calculating reduced frequency number for two modes of pure bending and pure torsion, the reduced frequency number defined by:

$$K = \frac{2\pi c \omega}{V_\infty}$$

wherein, K denotes reduced frequency, c denotes chord length, ω denotes natural frequency, and $V_\infty$ denotes impact velocity of a fluid at a leading edge of the blade; and performing, by the one or more processors, a fifth plurality of operations responsive to calculated K not being between 0.3 and 0.5 for the pure torsion mode and calculated K being more than 0.8 for the pure bending mode, the fifth plurality of operations comprising changing respective twist angles of the airfoil slices by an amount linearly increasing from −2° to 2° from a proximal end of the blade to a distal end of the blade, the proximal end of the blade airfoil comprising the junction of the blade airfoil and the blade root, the distal end of the blade airfoil comprising the tip of the turbine blade.

15. A method for designing a turbine blade, the method comprising:

receiving, at one or more processors, initial geometrical and aerodynamic information of the turbine blade;

determining, by the one or more processors, an area of maximum stress on the turbine blade by performing, by the one or more processors, a stress analysis on the turbine blade;

obtaining, by the one or more processors, the maximum amount of stress within the determined area of maximum stress;

obtaining, by the one or more processors, a safety factor; and performing, by the one or more processors, a first plurality of operations responsive to the safety factor being less than a first predetermined threshold and the determined area of maximum stress occurring at the junction of the blade airfoil and the blade root, the first plurality of operations comprising:

creating a fillet at the junction of the blade airfoil and the blade root; and increasing respective thickness of each airfoil slice of the plurality of airfoil slices with a distance from the junction of the blade airfoil and the blade root of no more than 15% of the blade airfoil length.

\* \* \* \* \*